(No Model.)

A. FELLOWS.
SPRING BACK FOR VEHICLE SEATS.

No. 316,449. Patented Apr. 28, 1885.

Witnesses:
P. M. Knobloch.
Samuel Edmonds.

Inventor:
Alfred Fellows,
By Wm Burris
Attorney.

UNITED STATES PATENT OFFICE.

ALFRED FELLOWS, OF CLINTON, IOWA.

SPRING-BACK FOR VEHICLE-SEATS.

SPECIFICATION forming part of Letters Patent No. 316,449, dated April 28, 1885.

Application filed September 13, 1884. (No model.)

*To all whom it may concern:*

Be it known that I, ALFRED FELLOWS, a citizen of the United States of America, residing at Clinton, in the county of Clinton and State of Iowa, have invented certain new and useful Improvements in Spring-Backs for Vehicles, of which the following is a specification, reference being had therein to the accompanying drawings.

This invention relates to spring-backs for carriages; and it consists of the back of a seat supported vertically upon springs attached in any suitable manner to the seat or to the body of the vehicle, as hereinafter fully set forth.

Figure 1:
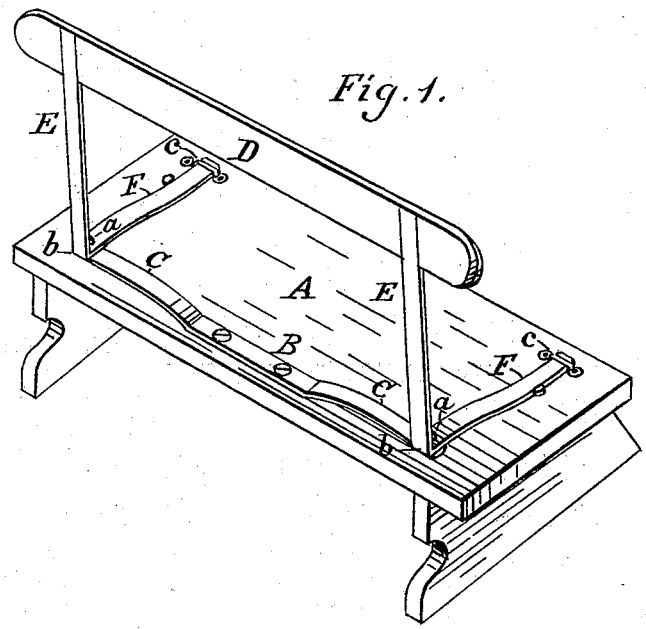
Figure 2:
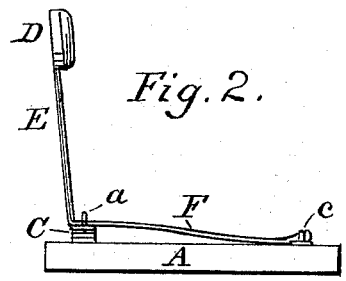
Figure 3:
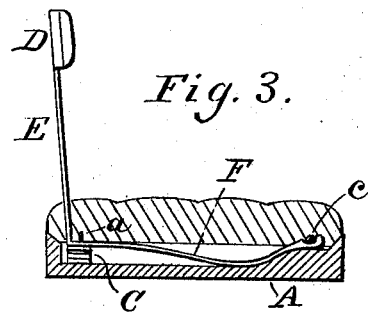

In the accompanying drawings, Figure 1 is a perspective view of a carriage-seat provided with my improvement. Fig. 2 is an end elevation of the same. Fig. 3 is a transverse section showing a modified construction, the seat being recessed to house the arms and spring.

A designates the seat.

B indicates a steel bar, the central portion of which is rigidly attached to the back portion of the seat, the ends of which bar are extended, forming the springs C C, provided with the upwardly-extended pins $a\ a$.

D is the seat-back supported by the standards E E, which are bent at $b\ b$ and extended forward, forming the arms F F. The front ends of these arms are held in place by clips $c\ c$, the ends of the arms and the clips being constructed in any suitable manner, so that the arms may be readily inserted in and removed from the clips for removing the seat, as hereinafter stated. At the bends or elbows of the standards and arms holes are provided to receive the pins $a$ on the springs for holding the seat in position laterally.

It will be seen that the springs are made the requisite lengths for their ends to form bearings to the elbows of the standards and arms.

The arms F and the springs B C C may be placed in recesses formed for that purpose in the seat, so as to place them below the upper surface of the seat, as shown in Fig. 3 of the drawings.

It is well known that in riding over rough places in a carriage having its seat-back rigidly attached to the seat an uncomfortable jarring effect is produced upon the back of the rider. In my improvement the seat-back, being supported upon the springs, yields to the pressure of the back of the rider, thus easing the force and lessening the effect of the jolting of the vehicle. The seat-back may be readily detached from and attached to the seat by removing the cushion, raising and placing the back in position for the hooked ends of the arms to be slipped out or inserted in the clips.

What I claim as new, and desire to secure by Letters Patent, is—

1. The combination, with a carriage-seat, A, of the springs C C and the seat-back D, supported upon the springs by devices, substantially as set forth.

2. The combination, with the carriage-seat A, of the seat-back D, standards E, arms F, clips $c\ c$, and springs C C, substantially as and for the purposes set forth and described.

In testimony whereof I hereto affix my signature in presence of two witnesses.

ALFRED FELLOWS.

Witnesses:
W. W. SANBORN,
H. F. BOWERS.